United States Patent [19]

McCauley

[11] Patent Number: 5,071,300
[45] Date of Patent: Dec. 10, 1991

[54] SHROUDED JAM LOCKNUT

[75] Inventor: Durham S. McCauley, Boston 050714476, N.Y.

[73] Assignee: McGard, Inc., Orchard Park, N.Y.

[21] Appl. No.: 655,808

[22] Filed: Feb. 15, 1991

[51] Int. Cl.⁵ .................... F16B 39/12; F16B 41/00
[52] U.S. Cl. .................................. 411/222; 411/239; 411/429; 411/432; 411/910
[58] Field of Search .............. 411/222, 372, 373, 374, 411/429, 430, 432, 910, 403, 187

[56] References Cited

U.S. PATENT DOCUMENTS

| | | |
|---|---|---|
| 897,168 | 8/1908 | Smith . |
| 1,623,686 | 4/1927 | Kolthoff . |
| 3,222,976 | 12/1965 | Holman . |
| 3,492,841 | 2/1970 | Ipri .................................. 411/429 |
| 4,309,139 | 1/1982 | Nakae ................................ 411/187 |
| 4,480,513 | 11/1984 | McCauley et al. ................. 411/403 |
| 4,521,146 | 6/1985 | Wharton ............................. 411/429 |
| 4,659,273 | 4/1987 | Dudley ........................... 411/910 X |
| 4,824,305 | 4/1989 | McCauley ....................... 411/910 X |
| 4,897,008 | 1/1990 | Parks .................................. 411/432 |

Primary Examiner—Neill R. Wilson
Attorney, Agent, or Firm—Joseph P. Gastel

[57] ABSTRACT

A shrouded jam locknut including a body member of frustoconical configuration having a larger base and a smaller base, a recess extending inwardly into the body member from the larger base and terminating at a shoulder for bearing against a nut in locking relationship therewith, a threaded bore extending inwardly into the body member from the shoulder for receiving the end of a threaded shank, a skirt surrounding the recess and terminating at an annular edge, and a key-receiving recess in the smaller base.

17 Claims, 2 Drawing Sheets

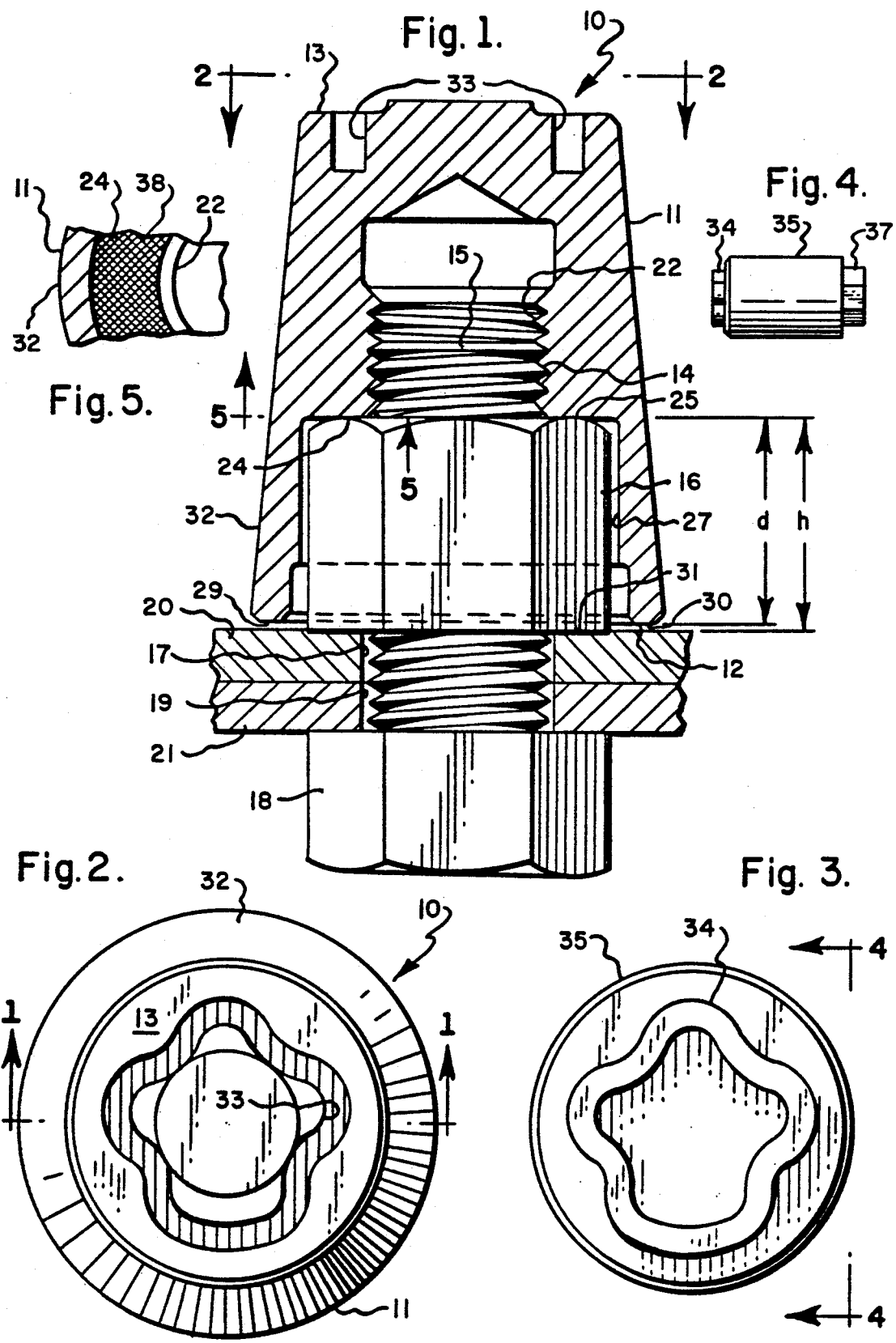

SHROUDED JAM LOCKNUT

BACKGROUND OF THE INVENTION

The present invention relates to a shrouded jam locknut.

There are certain situations wherein a valuable device is attached to a base or to another device by bolts having associated nuts which are exposed. In situations of this type the exposed nuts can be removed by ordinary wrenches, and the valuable device can be stolen. A situation of this type has existed in the past wherein a winch was mounted on a truck in such a manner that the nuts holding it were accessible and could be removed. Also, in a situation of the foregoing type, the device was subject to stress and vibration, which, in turn, could loosen the device. Thus, there are circumstances where the nut must be protected against unauthorized removal and also be jammed against loosening.

SUMMARY OF THE INVENTION

It is accordingly one object of the present invention to provide a shrouded jam locknut which conceals an exposed nut against unauthorized access and removal and which simultaneously provides a jamming action to the nut to prevent it from loosening.

It is another object of the present invention to provide a shrouded jam locknut which can only be installed and removed by means of a specialized key which provides a firm fit with the locknut. Other objects and attendant advantages will readily be perceived hereafter.

The present invention relates to a shrouded jam locknut comprising a frustoconical body member having a larger base and a smaller base, a recess in said larger base terminating at a shoulder, an annular lip at said larger base extending about said recess, a threaded bore in said body member extending from said shoulder toward said smaller base, and key-receiving means in said smaller base.

The various aspects of the present invention will be more fully understood when the following portions of the specification are read in conjunction with the accompanying drawings wherein:

BRIEF DESCRIPTION OF THE DRAWINGS

FIG. 1 is a fragmentary cross sectional view taken substantially along line 1—1 of FIG. 2 of one embodiment of the shrouded jam locknut of the present invention in bearing relationship against a nut threaded onto the shank of a bolt which holds two parts of an associated structure together;

Figure 6:
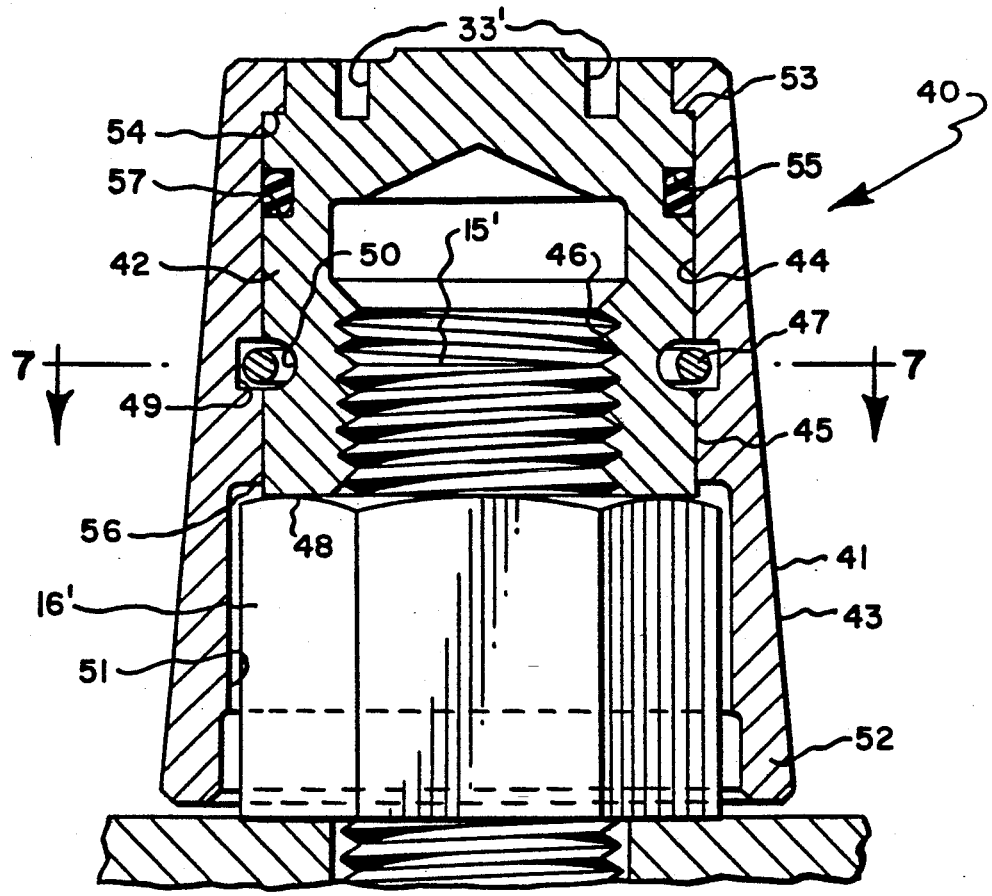
Figure 7:
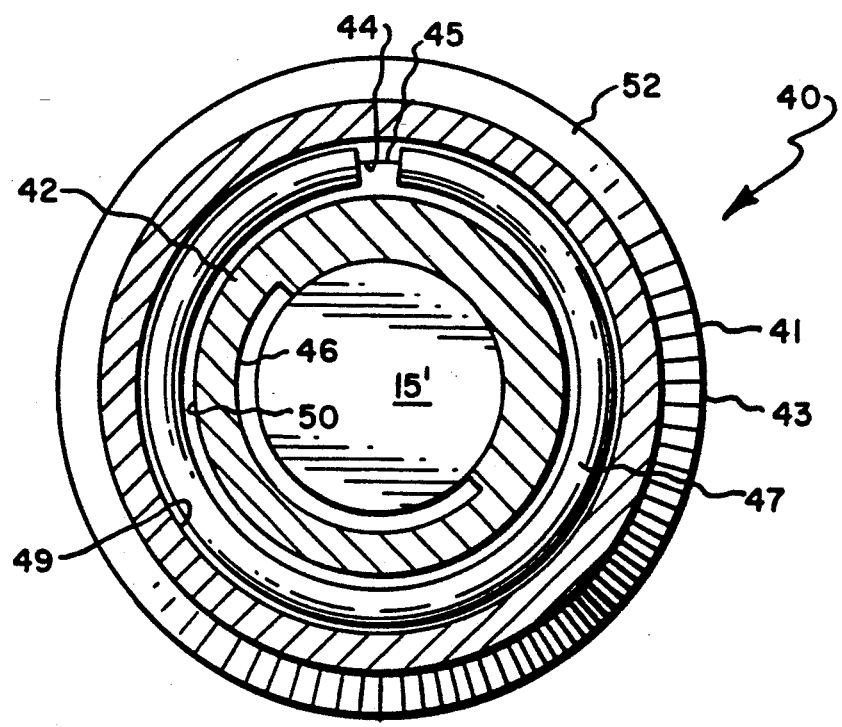

FI is a plan view of the top of the shrouded jam locknut taken substantially in the direction of arrows 2—2 of FIG. 1;

FIG. 3 is a plan view of the face of a key for turning the locknut;

FIG. 4 is a reduced side elevational view of the key taken substantially in the direction of arrows 4—4 of FIG. 3;

FIG. 5 is a fragmentary cross sectional view taken substantially along line 5—5 of FIG. 1 and showing a modified embodiment of the present invention;

FIG. 6 is a cross sectional view similar to FIG. 1 and showing a further modified embodiment of the present invention; and FIG. 7 is a cross sectional view taken substantially along line 7—7 of FIG. 6.

DESCRIPTION OF THE PREFERRED EMBODIMENTS

The shrouded jam locknut 10 of the present invention comprises a frustoconical body member 11 having a large base 12 and a small base 13. It is intended to be used against an exposed nut 16 through which the threaded shank 14 of bolt 15 extends after passing through apertures 17 and 19 in a pair of mating members 20 and 21, respectively. Head 18 of bolt 15 bears against member 21. Member 20 is a part of a device which is attached to member 21 which is part of another device. Usually bolt head 18 is located in a place wherein access cannot be had thereto, that is, it may be in an extremely confined location where a wrench cannot be placed, but nut 16 is accessible for removal.

The locknut 11 includes a threaded bore 22 which receives the end of bolt shank 14 in threaded relationship, and it also includes an annular shoulder 24 which bears against the face 25 of the nut in locking relationship. The nut 16 fits within a recess 27 of locknut 11, and the outer end of the recess is defined by the annular end 29 of the large base of frustoconical body member 11. The recess 27, at shoulder 24, is of larger diameter than the maximum diameter of nut 16, and thus it is assured that when the body member 11 is tightened down onto nut 16, the shoulder 24 will firmly engage the face 25 of nut 16 and thus prevent the nut from turning. Also, the depth d of recess 27 is smaller than the height h of nut 16. Therefore, there will always be a clearance at 30 between annular rim 29 and the surface 31 on which nut 16 bears, to assure a tight bearing relationship of shoulder 24 onto the face of nut 16. If a particular application should use a washer between nut 16 and surface 31, the lock design will be such that depth d of recess 27 will cover both nut 16 and the washer, while maintaining clearance at 30 as above. The lower portion 32 of body member 11 which defines the recess 27 is a shroud or skirt which conceals nut 16 against access.

A groove or recess 33 of a specific predetermined configuration is provided in smaller base 13 for receiving a mating ridge 34 of key 35 for tightening body member 11 onto shank 14 and for loosening it therefrom. Key 35 has a head 37 for receiving a suitable wrench for turning it when it is in mating relationship with recess 33. It will be appreciated that only a mating key can be used to turn locknut 10, considering that a wrench cannot grip the conical outer surface of body member 11. If desired, a thread-locking compound can be applied at the end of shank 14 to further prevent unauthorized removal of jam locknut 10. While head 37 is shown as a male member mating with a wrench, alternate designs, such as an internal (female) square, can be substituted.

If desired, the face 24 of the shoulder may be knurled as at 38 to provide good gripping engagement with the face 25 of nut 16. However, such knurling is not necessary.

While the bolt head 18 has been described above as being in a confined place which may not be easily accessible to a wrench or which may not at all be accessible to a wrench, it will be appreciated that even if it is accessible, the shrouded jam locknut 10 will prevent the removal of bolt 15 because if head 18 is turned, nut 16 will turn with it, especially if a thread locking compound is used at threads 22. It will also be appreciated that locknut 10 can be used on devices wherein a threaded shank or stud is part of an underlying member and extends through an overlying member onto which a nut is mounted.

Another embodiment of the present invention is shown in FIGS. 6 and 7. The shrouded jam locknut 40 may have all of the attributes of the embodiments of FIGS. 1-5. However, it differs therefrom in that the body member 41 consists of two parts. The first part is a locknut portion 42 which has an internal thread 46 for mounting on a threaded shank 15' of a bolt such as bolt 15 of FIG. 1. Locknut portion 42 has a curvilinear groove 33' therein which is analogous to curvilinear groove 33 shown in FIG. 2. Member 42 also has an annular shoulder 48 for bearing on a nut 16'. Annular shoulder or ledge 56 of shell 43 is slightly higher than shoulder 48 so that it will not bear on nut 16'. A shell 43 has an internal surface 44 which is rotatably mounted in complementary relationship on the external surface 45 of locknut portion 42. The outer surface of shell 43 is frustoconical so that a conventional wrench cannot be successfully applied thereto. A split snap ring 47 bridges groove 49 in shell 43 and groove 50 in member 42 to hold the parts together with surfaces 44 and 45 in mating relationship. A nut 16' fits into space 51 encompassed by skirt portion 52. The parts are assembled by installing the split ring 47 into groove 50 and thereafter moving locknut portion 42 upwardly into shell 43. As member 42 moves upwardly, the split ring 47 will be held in groove 50 by surface 44 until such time as snap ring 47 is aligned with groove 49, and at this time it will snap into this groove. In its installed position, snap ring 47 bridges shell 43 and member 42 so that they cannot be separated. In its installed position, an annular shoulder 53 on member 42 bears against annular ledge 54 of shell 43. An O-ring seal 55 may be located in annular groove 57.

Split ring 47 is fabricated of a material possessing enough strength so that once the member 42 and shell 43 are assembled, they cannot be separated. The relationship between shoulder 53 and ledge 54 provides additional protection against member 42 moving out of the upper end of shell 43. However, the shoulders 53 and 54 are optional and the contacting surfaces between members 42 and 43 may be perfectly straight because the split ring 47 will prevent these parts from separating. If the shoulders 53 and 54 are not used, the snap ring 47 and the sizes of slots 49 and 50 should be dimensioned so that shoulder 56 cannot bear on nut 16'. Furthermore, if desired, mating surfaces 44 and 45 may be frustoconical. As noted above, the advantage of the embodiment of FIGS. 6 and 7 is that shell 43 will rotate relative to member 42 and thus, even if a wrench somehow can be applied to the outer surface of shell 43 to turn it, this turning action will be ineffectual for turning member 42.

While the embodiment of FIGS. 6 and 7 has been shown as having a frustoconical outer surface, it will be appreciated that since the shell 43 is rotatable on the inner member 42, the outer configuration can be cylindrical or of any other shape because turning the shell will not result in turning the inner member to unthread it.

While preferred embodiments of the present invention have been disclosed, it will be appreciated that it is not limited thereto but may be otherwise embodied within the scope of the following claims.

What is claimed is:

1. A shrouded jam locknut for bearing against the outer face of a nut between a threaded bore therein and its outer side comprising a frustoconical one-piece unit including a body member having a larger base and a smaller base, recess means in said larger base terminating at shoulder means for bearing against said outer face of said nut between said threaded bore and said outer side of said nut, annular skirt means at said larger base extending about said recess for positioning in spaced relationship to said outer side of said nut and dimensioned to be entirely out of effective contact therewith under all conditions for permitting said body member to be turned without said skirt means effectively engaging said outer side of said nut, a threaded bore in said body member extending from said shoulder means toward said smaller base, and key-receiving means of a permanent fixed configuration in said smaller base of said body member for coacting with a key for installing and removing said locknut relative to said associated nut.

2. A shrouded jam locknut as set forth in claim 1 wherein said key-receiving means comprises a groove.

3. A shrouded jam locknut as set forth in claim 1 wherein said shoulder means is knurled.

4. A shrouded jam locknut as set forth in claim 1 wherein said frustoconical body member has a completely uninterrupted smooth outer surface.

5. A shrouded jam locknut for use on a nut which has an outer face between a threaded bore therein and its outer side and which is mounted on a threaded stud and presses on a surface and which has the outer end of the threaded stud extending beyond said outer face of the nut comprising a frustoconical one-piece unit including a body member having a frustoconical outer surface and having a larger base and a smaller base, a recess in said larger base terminating at a shoulder for bearing on said outer face of said nut between said threaded bore and said outer side thereof to produce a jamming action, said recess being surrounded by a skirt which shrouds said nut, said skirt having an inner side and an outer side with said outer side of said skirt being a portion of said outer surface of said frustoconical body member and the end of said skirt being an annular outer portion of said larger base of said frustoconical body member, said skirt being of a height which is less than the effective depth of said nut so that said shoulder will bear on said nut because a clearance will exist between said surface and said annular outer portion of said skirt, said inner side of said skirt being dimensioned so as to be entirely out of effective engagement with said nut under all conditions for permitting said body member to be turned without said skirt means effectively engaging said nut, and key-receiving means of a permanent fixed configuration in said smaller base of said body member for coacting with a key for installing and removing said locknut from said threaded stud.

6. A shrouded jam lockout as set forth in claim 5 wherein said key-receiving means comprises a groove.

7. A shrouded jam locknut as set forth in claim 5 wherein said shoulder is knurled.

8. A shrouded jam locknut as set forth in claim 5 wherein said frustoconical body member has a completely uninterrupted smooth outer surface.

9. In an installation wherein a nut which has an outer face between a threaded bore therein and an outer side thereof and is mounted on a stud to bear on a surface and wherein a portion of said stud extends through said nut, a shrouded jam locknut comprising a frustoconical one-piece unit including body member having a larger base and a smaller base, a recess in said larger base terminating at a shoulder, said recess being of a size to permit said shoulder to bear against said outer face of said nut between said threaded bore and said outer side thereof to produce a jamming action, said recess being surrounded by a skirt which shrouds said nut, said skirt having an inner side and an outer side with said outer side of said skirt being a portion of said outer surface of said frustoconical body member and the end of said skirt being an annular outer portion of said larger base of said frustoconical member, said skirt being of a height which is less than the effective depth of said nut so that said shoulder will bear on the said nut because a clearance will exist between said surface and said annular outer portion of said skirt, said inner side of said skirt being dimensioned so as to be entirely out of effective engagement with said nut under all conditions for permitting said body member to be turned without said skirt means effectively engaging said nut, and key-receiving means of a permanent fixed configuration in said smaller base of said body member for coacting with a key for installing and removing said locknut.

10. S shrouded jam locknut comprising a frustoconical body member having a larger base and a smaller base, a recess in said larger base terminating at a shoulder, an annular skirt at said larger base extending about said recess, a threaded bore in said body member extending from said shoulder toward said smaller base, key-receiving means in said smaller base, said body member comprising an inner member on which said shoulder is located, a shell surrounding said inner member of which said skirt is a part, securing means rotatably securing said shell on said inner member, and said securing means comprising a split ring located between a first groove in said inner member and a second groove in said shell.

11. A shrouded jam locknut as set forth in claim 10 including seal means between said inner member and said shell, said seal means being axially positioned between said split ring and said key-receiving means.

12. A shrouded jam locknut for use on a nut which is mounted on a threaded stud and presses on a surface and which has the outer end of the threaded stud extending beyond the outer face of the nut comprising a frustoconical body member having a larger base and a smaller base, a recess in said larger base terminating at a shoulder for bearing on said nut, said recess being of a size to permit said shoulder to bear against said nut to produce jamming action, said recess being surrounded by a skirt which shrouds said nut and the outer side of said skirt is a portion of the outer surface of said frustoconical body member and the end of said skirt is the annular outer portion of said larger base of said frustoconical body member, said skirt being of a height which is less than the effective depth of said nut so that said shoulder will bear on said nut because a clearance will exist between said surface and said annular outer portion of said skirt, key-receiving means in said smaller base, said body member comprising an inner member on which said shoulder is located, a shell surrounding said inner member of which said skirt is a part, securing means rotatably securing said shell on said inner member, and said securing means comprising a split ring located between a first groove in said inner member and a second groove in said shell.

13. A shrouded jam locknut as set forth in claim 12, including seal means between said inner member and said shell, said seal means being axially positioned between said split ring and said key-receiving means.

14. In an installation wherein a nut is mounted on a stud to bear on a surface and wherein a portion of said stud extends through said nut, a shrouded jam locknut comprising a frustoconical body member having a larger base and a smaller base, a recess in said larger base terminating at a shoulder, said recess being of a size to permit said shoulder to bear against said nut to produce a jamming action, said recess being surrounded by a skirt which shrouds said nut and the outer side of said skirt is a portion of the outer surface of said frustoconical body member and the end of said skirt is the annular outer portion of said larger base of said frustoconical member, said skirt being of a height which is less than the effective depth of said nut so that said shoulder will bear on said nut because a clearance will exist between said surface and said annular outer portion of said skirt, key-receiving means in said smaller base, said body member comprising an inner member on which said shoulder is located, a shell surrounding said inner member of which said skirt is a part, securing means rotatably securing said shell on said inner member, and said securing means comprising a split ring located between a first groove in said inner member and a second groove in said shell.

15. In an installation as set forth in claim 14 including seal means between said inner member and said shell, said seal means being axially positioned between said split ring and said key-receiving means.

16. A shrouded jam locknut comprising a frustoconical body member having first and second ends, a recess in said first end terminating at a shoulder, an annular skirt at said first end extending about said recess, a threaded bore in said body member extending from said shoulder toward said second end, key-receiving means in said second end, said body member comprising an inner member on which said shoulder is located, a shell surrounding said inner member of which said skirt is a part, securing means rotatably securing said shell on said inner member, and said securing means comprising a split ring located between a first groove in said inner member and a second groove in said shell.

17. A shrouded jam locknut as set forth in claim 16 including seal means between said inner member and said shell, said seal means being axially positioned between said split ring and said key-receiving means.

* * * * *

UNITED STATES PATENT AND TRADEMARK OFFICE
CERTIFICATE OF CORRECTION

PATENT NO. : 5,071,300

DATED : December 10, 1991

INVENTOR(S) : Durham S. McCauley

It is certified that error appears in the above-identified patent and that said Letters Patent is hereby corrected as shown below:

Column 1, line 55, change "FI" to --FIG. 2--.

Column 5, line 13 (claim 9), cancel "the";

line 23 (claim 10), change "S" to --A--;

line 49 (claim 12), after "produce" insert --a--.

Signed and Sealed this

Thirtieth Day of March, 1993

*Attest:*

STEPHEN G. KUNIN

*Attesting Officer*     *Acting Commissioner of Patents and Trademarks*